Patented Jan. 9, 1951

2,537,510

UNITED STATES PATENT OFFICE 2,537,510

METHOD OF EXTRACTION OF TANNIC ACID FROM SUMAC LEAF

Gino Carrara, Milan, Italy

No Drawing. Application February 17, 1948, Serial No. 9,006. In Italy December 22, 1941

4 Claims. (Cl. 260—473.6)

Ether-extracted tannic acid is a particular kind of pure tannic acid having valuable properties under the aspect of color, light weight and solubility, and is employed in the wine industry for clarifying high-grade wines, in the manufacture of synthetic dyestuffs, inks, mordants for dyeing, etc.

The raw material generally employed heretofore for this manufacture was the gall-nut from China, namely, the particular excrescence of woody aspect formed on the leaves of *Rhus semialata*, a plant widely spread in China, Japan and Northern Indies, on a sting by a particular insect (*Aphis chinensis*).

The gall-nut was a rawstuff well suited for this manufacture, as it contains about 75-80% tannin, about 4-5% of other tanning agents and only a small percentage of impurities.

The method of producing ether-extracted tannin from this rawstuff was, consequently, no difficult problem to solve, and it consisted essentially in a preliminary extraction of the nut with water for producing a watery extract, from which tannin was extracted by means of an alcohol and ether mixture. The alcoholic-ethereal extract was thereupon concentrated and dried on rotary drying cylinders.

The final product was light-yellow in colour, had an apparent specific weight of about 0.2 and contained about 87-90% tannin (filter analysis), 2-4% non-tannin stuffs, 8-12% water. The color test carried out on Lovibond's colorimeter on a 5% aqueous solution gave as an average 0.2-0.3 yellow points.

Applicant succeeded, after thorough investigation, in obtaining a tannin having approximately the same properties, by utilising a national rawstuff, more particularly sumac leaves (*Rhus coriaria*), which are harvested mainly in Sicily.

The sumac leaf, as usually employed for the tanning industry, contains as an average 26-28% tannin stuffs and 14-16% non-tannin stuffs.

The tannin contained therein belongs to the same class as the tannin contained in the Chinese gall-nut, being a so-called pyrogallic tannin consisting prevailingly of a glucoside of the gallic acid. In fact, according to researches by Fischer-Freudenberg, the gall-nut tannin is a penta-digalloyl-glucose, while the tannin from sumac has a penta-galloyl-glucose structure. Consequently, the chemical properties of the two tannins are necessarily very similar. Based upon these premises, the method according to this invention was developed.

The very first tests showed that the total aqueous extract of the sumac leaf was unsuitable for the conventional treatment with an alcohol-ether mixture, unlike the aqueous extract of Chinese gall-nut.

It was ascertained that extraction of tannin from the aqueous liquid could be effected much more conveniently by means of acetic ether, according to the old directions of Löwe (Löwe—Die Chemie der natürlichen Gerbstoffe). The extract obtained by treating the total watery extract of sumac leaves by means of acetic ether was unfit for drying, as it became caramelled on the revolving heated cylinder and melted instead of frying, giving rise to a light spongy mass.

The difficulty was solved by modifying the method of aqueous extraction of the leaf, that is, by carrying out a fractional aqueous extraction and subsequently extracting by acetic ether only a determined portion of the aqueous extracts.

A preferred manner of carrying out this process is as follows:

The pulverised sumac leaf is extracted by water at a temperature not exceeding 50°. Extraction is carried out by percolation till about 50-55% of the tannin contained in the leaf is removed therefrom. The resulting liquors are subjected to a preliminary concentration to about 10-12° Bé., cooled to about 0° and maintained at this temperature during some days.

The extracts are thereupon clarified in a decantation centrifuge and the resulting clear liquor is again concentrated to about 28-30° Bé.

The resulting extract contains about 27-28% tannin and 22-24% non-tannin stuffs, that is, a non-tannin content exceeding the original content of the leaf.

This extract only is suitable for further manipulation, while an extract obtained by thoroughly extracting the leaf, after this has been partly extracted by water in a battery in countercurrent, and containing approximately 40% of the total tannin present in the leaf, cannot be usefully employed in the manufacture of ether-extracted tannin, and may be utilised exclusively in the manufacture of gallic acid by the known methods, or it may be used in tannery.

The first mentioned extract is subsequently extracted by acetic ether in stirring apparatus. About 1.2 parts acetic ether to 1 part special sumac extract are employed.

The acetic ether extract is concentrated to a reduced volume in a vacuum concentrator, the solvent being recovered. The concentrated extract, containing not more than 25-30% acetic ether, is directly brought to the drying cylinders, where it is dried at a temperature of about 120° at atmospheric pressure. The resulting product undergoes a so-called ageing stage, as is normally done with ether-extracted tannin, by placing it in a relatively thin layer on slabs in a slightly moist surrounding, so that it re-absorbs a certain percentage of moisture, say 8–10%.

The final product obtained is of particularly light weight (specific weight 0.1–0.12) and its properties on analysis are rather similar to those of gall-nut tannin (tannin contents 86–88%, non-tannin stuffs 3.4%, water 9–10%). It distinguishes from gall-nut tannin through a slightly deeper yellow hue (yellow points 0.5–0.6 instead of 0.2–0.3) due to the presence of xantophyl originally contained in the leaf.

The tannin output corresponds to about 75% of the tanning stuffs originally contained in the special sumac extract.

What I claim is:

1. In a method for the recovery of a low specific gravity light colored tannin from sumac leaves the steps of extracting the pulverized leaves with water by percolation and at a temperature not exceeding 50° C. until about 50 to 55 per cent of the tannin contained in the leaves is removed as an aqueous solution, concentrating the same to about 10–12° Bé., cooling to about 0° C., further concentrating to about 28 to 30° Bé. and extracting with ethyl acetate, the ratio of the acetate to the extract being about 1.2 to 1.

2. In a method for the recovery of a low specific gravity light colored tannin from sumac leaves the steps of extracting the pulverized leaves with water by percolation and at a temperature not exceeding 50° C. until about 50 to 55 per cent of the tannin contained in the leaves is removed as an aqueous solution, concentrating the same to about 10–12° Bé., cooling to about 0° C., further concentrating to about 28 to 30° Bé., extracting with ethyl acetate, the ratio of the acetate to the extract being about 1.2 to 1, concentrating the extract by distillation in vacuo to an ethyl acetate content of not more than about 25 to 30 per cent and drying the same at a temperature of about 120° C.

3. In a method according to claim 1 the step of effecting the concentration to about 10–12° Bé. in vacuo.

4. In a method according to claim 2 the step of decanting the extract upon cooling to about 0° C. in a centrifuge.

GINO CARRARA.

REFERENCES CITED

The following references are of record in the file of this patent:

UNITED STATES PATENTS

| Number | Name | Date |
|---|---|---|
| 517,626 | Reinus | Apr. 3, 1894 |
| 531,752 | Schweitzer | Jan. 1, 1895 |
| 1,078,893 | Allen | Nov. 18, 1913 |

OTHER REFERENCES

Kutateldze et al., Chemical Abstracts, vol. 41, column 7148 (1947)—(i and e).